April 2, 1946.

F. G. FOLBERTH ET AL 2,397,599

WINDSHIELD CLEANER MOTOR

Filed Sept. 24, 1941

INVENTORS
FREDERICK G. FOLBERTH
WILLIAM M. FOLBERTH

BY

ATTORNEYS

April 2, 1946.  F. G. FOLBERTH ET AL  2,397,599
WINDSHIELD CLEANER MOTOR
Filed Sept. 24, 1941  6 Sheets-Sheet 3

INVENTORS
FREDERICK G. FOLBERTH
& WILLIAM M. FOLBERTH
BY
Bosworth & Sessions
ATTORNEYS April 2, 1946.     F. G. FOLBERTH ET AL     2,397,599
WINDSHIELD CLEANER MOTOR
Filed Sept. 24, 1941          6 Sheets-Sheet 4

INVENTORS
FREDERICK G. FOLBERTH
& WILLIAM M. FOLBERTH
BY
Bosworth & Sessions
ATTORNEYS April 2, 1946.  F. G. FOLBERTH ET AL  2,397,599
WINDSHIELD CLEANER MOTOR
Filed Sept. 24, 1941  6 Sheets-Sheet 5

INVENTORS
FREDERICK G. FOLBERTH
& WILLIAM M. FOLBERTH
BY Bosworth & Sessions
ATTORNEYS April 2, 1946.  F. G. FOLBERTH ET AL  2,397,599
WINDSHIELD CLEANER MOTOR
Filed Sept. 24, 1941  6 Sheets-Sheet 6

INVENTORS
FREDERICK G. FOLBERTH
& WILLIAM M. FOLBERTH
BY Bosworth & Sessions
ATTORNEYS

UNITED STATES PATENT OFFICE 2,397,599

WINDSHIELD CLEANER MOTOR

Frederick G. Folberth and William M. Folberth, Cleveland, Ohio

Application September 24, 1941, Serial No. 412,142

10 Claims. (Cl. 121—151)

This invention relates to fluid pressure actuated motors, and more particularly to an improved hydraulic motor for operating windshield cleaners or the like.

In our copending United States patent application Serial No. 382,040 filed March 6, 1941, now Patent No. 2,343,656, issued March 7, 1944, we have described and claimed an improved windshield cleaner motor adapted to be operated by oil or other liquid under pressure. The motor of said application is characterized by being operable in such a manner that a predetermined lag or delay may occur at a particular point in the stroke of the cleaner wiper arm. The present invention contemplates certain modifications and improvements on the general type of motor disclosed in my said copending application.

It is among the objects of the present invention to provide a hydraulic motor, particularly adapted for operating windshield cleaners, of compact design whereby it will occupy a minimum of space and be of light weight. Other objects of our invention include: the provision of a powerful and flexible windshield cleaner motor which is particularly adapted for use on aircraft; the provision of a windshield cleaner motor which may be operated either to produce a substantially continuous reciprocating stroke or to produce a reciprocating stroke with a lag or delay at one or more portions of the stroke; the provision of a hydraulic windshield cleaner motor of the type described which will always stop with the driving member of the motor in the same position whereby the squeegee blade of the cleaner will always stop in the same location; the provision of a hydraulic motor of the type described having a starting and stopping valve which will permit continuous operation of the pump which supplies liquid under pressure to the motor, and which will also permit free manual movement of the windshield cleaner arm when the flow of oil through the motor is shut off; and the provision of a powerful and efficient windshield cleaner motor which may be operated over an extremely wide range of speeds, and which is substantially noiseless and vibrationless at all speeds.

The above and other objects of our invention will appear from the following description of the several embodiments thereof, reference being had to the accompanying drawings in which.

In our above identified copending patent application an oil pressure actuated motor has been illustrated as mounted in a closed vessel adapted to hold a supply of oil for operating the motor. A pump in the vessel is associated with the motor, is driven from any suitable source of power, and circulates oil from the vessel through the motor and back to the vessel again. The illustrated embodiment of our present invention is adapted to be similarly mounted in an enclosing vessel in which a supply of oil is retained. However, it will appear to those skilled in the art that our hydraulic motor may be operated from any suitable source of liquid under pressure, which may be piped to and from the motor in well-known manner.

Figure 17:
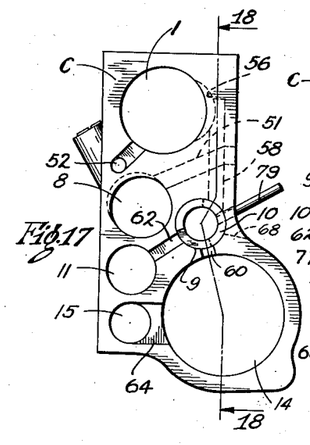
Figure 17 is an end elevation of the main casting, generally similar to Figure 10, but showing the lag control sleeve in position.
Figure 18:
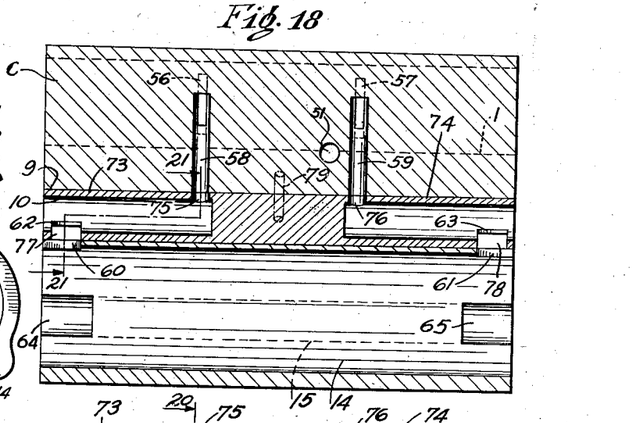
Figure 18 is a vertical cross-sectional view taken on line 18—18 of Figure 17.
Figures 19, 20, 21, 22, 23, 24:
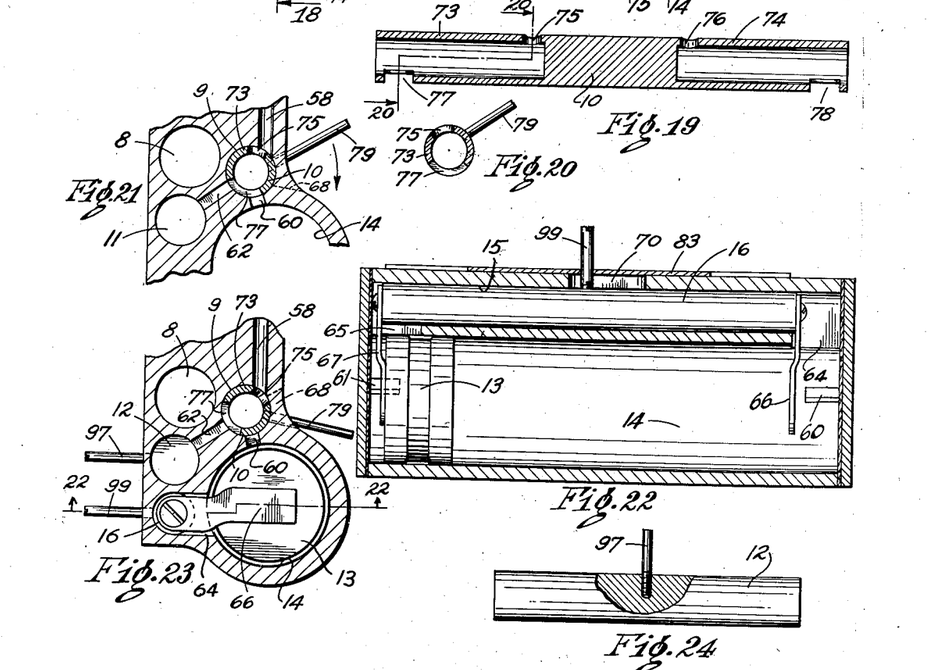
Figure 19 is a detached vertical cross-sectional view through the lag control sleeve.
Figure 20 is a transverse cross-sectional view taken on line 20—20 of Figure 19.
Figure 21 is a fragmentary cross-sectional view taken on line 21—21 of Figure 18, and showing the lag control sleeve in position to cause the motor to operate with a predetermined lag or delay at each end of its stroke.
Figure 22 is a horizontal cross-sectional view taken on line 22—22 of Figure 1, and line 22—22 of Figure 23 but rotated 90° in a clockwise direction and showing the lag or delay cylinder and the operating valve actuating plunger associated therewith.
Figure 23 is a fragmentary cross-sectional view, generally similar to Figure 21, but showing the lag control sleeve in position to cause the motor to operate with a minimum lag at the ends of its stroke.
Figure 24 is a detached view, partly in section, of the small piston for operating the main valve.
Figures 36, 37, 38, 39, 40:
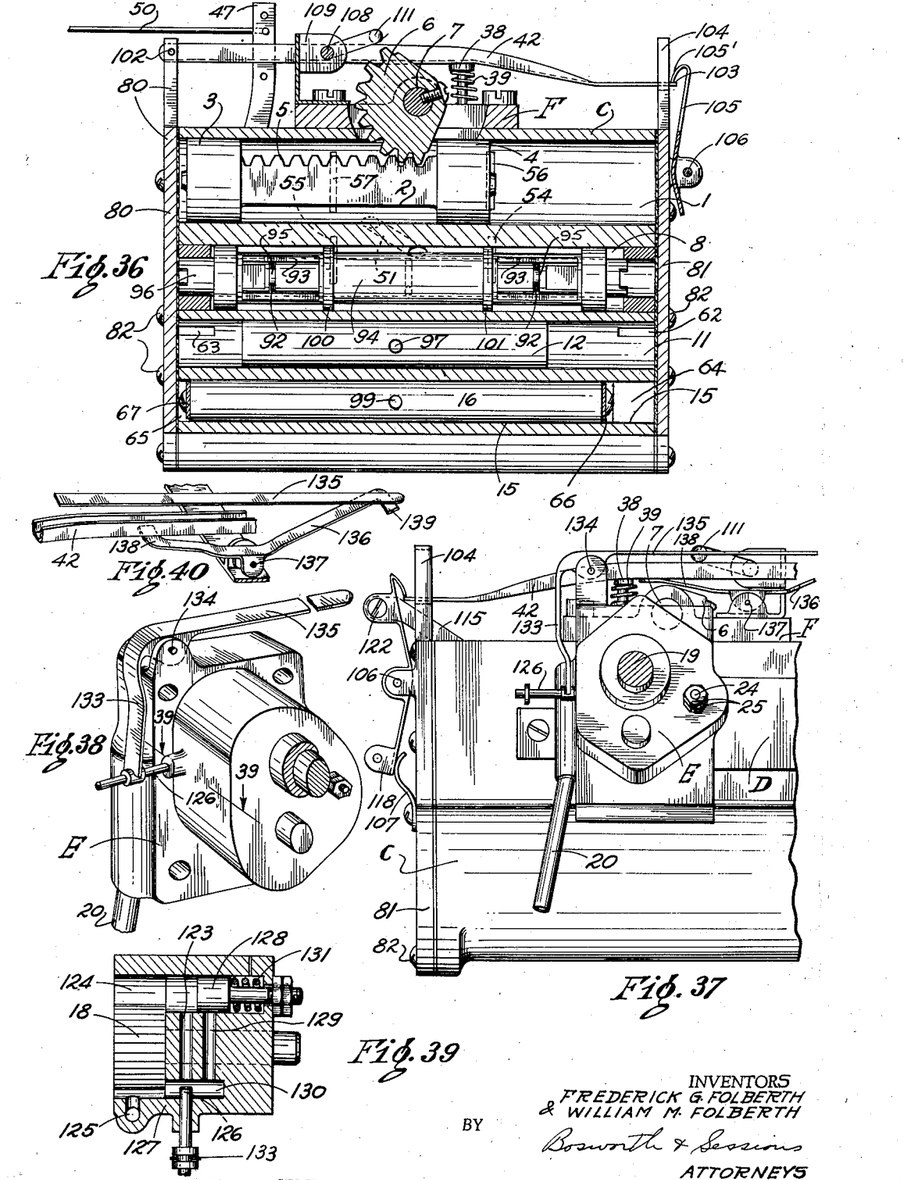
Figure 36 is a cross-sectional view of our assembled motor taken on line 36—36 of Figure 3.
Figure 37 is a fragmentary view generally similar to Figure 2, but illustrating a modified control mechanism for the pump and motor.
Figure 38 is a detached perspective view of the pump shown in Figure 37 with the auxiliary by-pass valve incorporated therein.
Figure 39 is a cross sectional view taken on line 39—39 of Figure 38, and illustrating the auxiliary by-pass valve in open or motor-idle position.
Figure 40 is a fragmentary detached perspective view illustrating the interlocking lever arrangement for controlling the operation of the by-pass valve and the start and stop control valve.

Referring to the drawings, our improved motor includes a main casting C, a control valve housing D, a pump and associated parts generally indicated at E, and a wiper arm operating shaft supporting bracket F. As is perhaps best seen in Figures 9 and 10 the main casting C defines the operating cylinder 1 in which the double ended piston member 2 (Figure 36) is disposed. The end portions 3 and 4 of piston 2 are connected by a bar-like member which has a rack 5 formed on its upper side. This rack engages a gear segment 6, secured to the shaft 7 which in turn is supported by the brackets F and which may be connected in any suitable manner to drive the wiper blade or blades (indicated at S in Fig. 2) of the cleaner. In the casting C below the main cylinder 1 is a main operating valve chamber 8 in which the valve which controls the flow of liquid to the cylinder 1 is disposed. This valve will be described more in detail later, but is generally similar to the valve disclosed in our above noted United States patent application. Also below the cylinder 1 in the casting C is a bore 9 for the lag control sleeve generally indicated at 10 (Figures 17 and 18). Another bore 11 constitutes a chamber for the rapid action valve actuating piston 12 which is supported and guided therein (Figs. 23, 24 and 36). A floating delay piston 13 (Figure 22) reciprocates within the delay cylinder 14 and a bore 15 in the casting C provides a support for the sliding bar member 16, which forms a part of the connections from the delay piston 13 to the main operating valve as will appear later.

Figures 25, 26, 27, 28, 29:
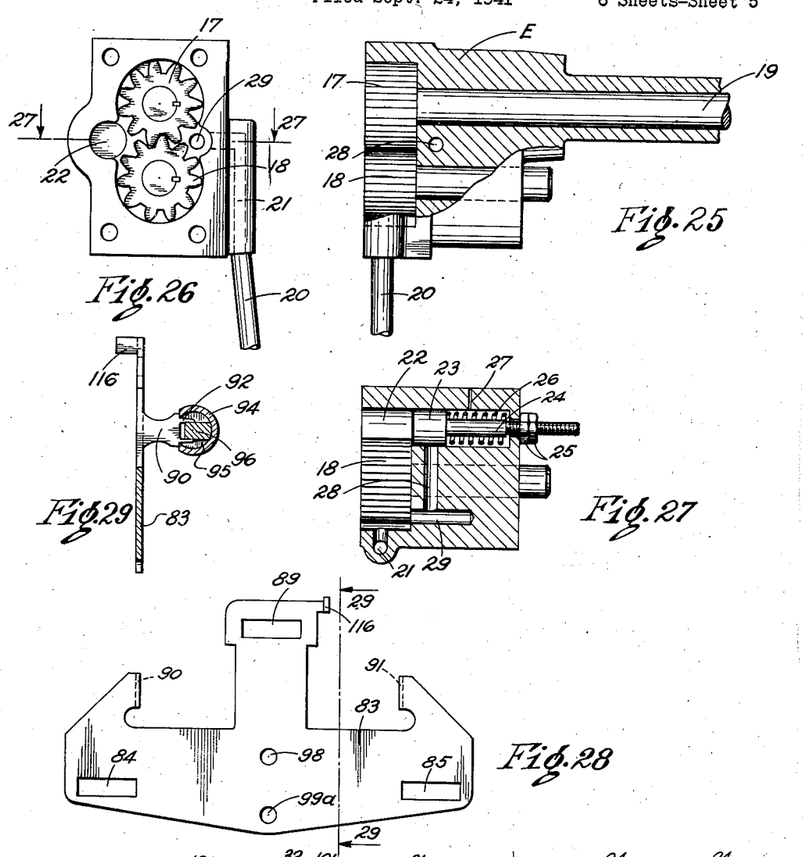
Figure 25 is a detached side elevation, partly in section, of the pump which supplies liquid under pressure to the motor.
Figure 26 is an end elevation of the pump shown in Figure 25.
Figure 27 is a horizontal cross-sectional view taken on line 27—27 of Figure 26.
Figure 28 is a detached side elevation of the operating valve actuating plate.
Figure 29 is a detached illustrative view, partly in section, showing the operating valve actuating plate, and its connection to the operating valve, the view being taken substantially on line 29—29 of Figure 28 with the operating valve added.

The pump E (Figs. 25, 26 and 27) is preferably of the usual gear type and includes a pair of gears 17 and 18, gear 17 having a shaft 19 extending out of the housing and adapted to be connected to any suitable driving means. An inlet to the gear pump is provided through a tube 20 and a passage 21 in the gear housing and oil is discharged from the gears 17 and 18 into a chamber 22 (see Figures 26 and 27). An adjustable pressure regulating or safety relief valve is provided for the pump E, and comprises a piston 23 secured to a rod 24 which extends out of the pump housing and is provided with stop nuts 25 adapted to regulate the position of the piston 23. A spring 26 urges the piston 23 to the left (Fig. 27) and a small bleed hole 27 permits the piston 23 to operate freely in its bore. The transverse hole 28 connects to another passage 29 which, as seen in Figures 26 and 27, joins the intake side of the pump.

When pressure delivered by the pump is sufficiently great to compress the spring 26 and cause the piston 23 to expose the end of the hole 28, oil, or whatever operating fluid may be employed, will be by-passed through the passages 28 and 29 around the pump into the pump inlet. This will reduce the pressure and permit the piston 23 again to close off the end of the hole 28. By properly regulating the resistance of the spring 26, this valve arrangement will act to maintain the pump pressure at not over a predetermined value.

Figures 3, 4, 5, 6, 7, 8:
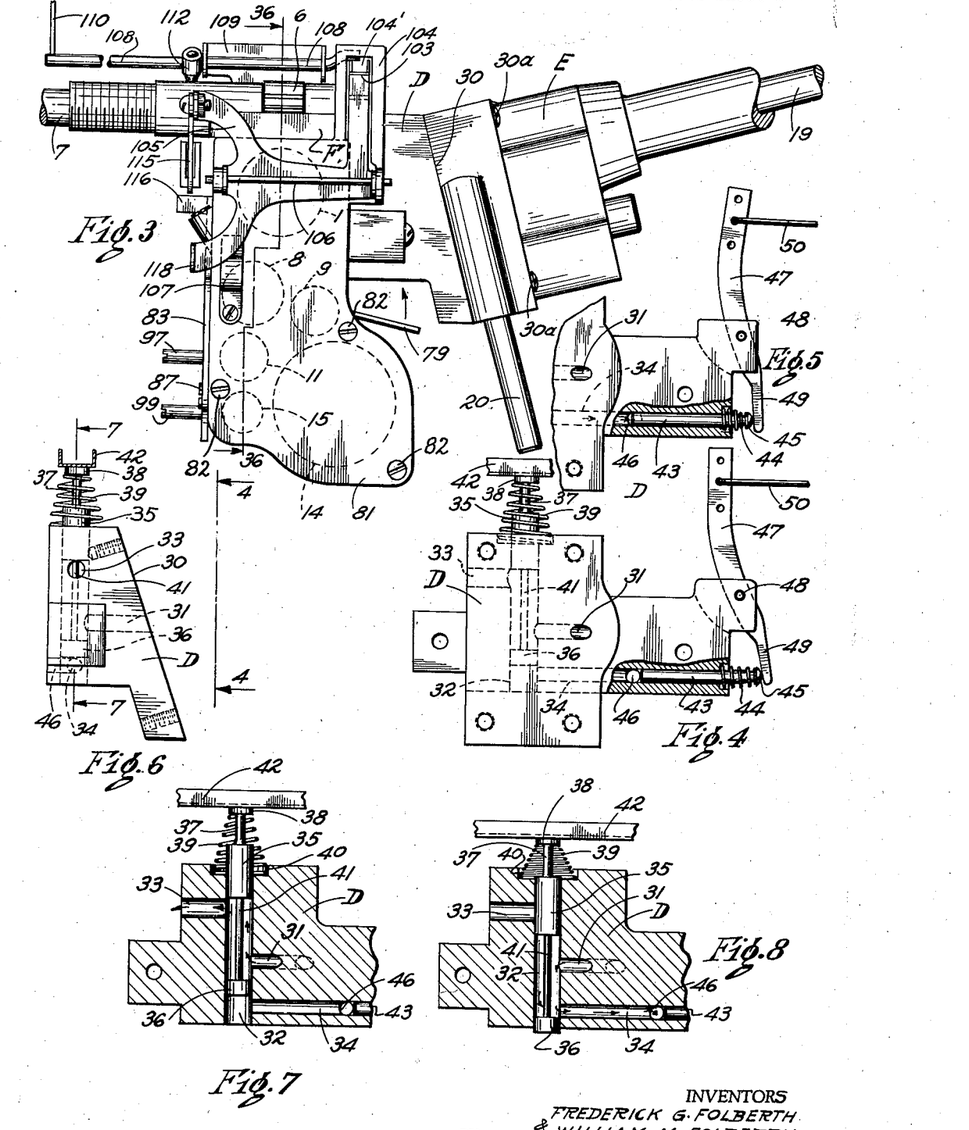
Figure 3 is an end elevation of the motor shown in Figures 1 and 2 taken substantially on line 3—3 of Figure 2.
Figure 4 is a fragmentary view, partly in cross section, illustrating the valve housing block, the speed regulating valve being shown in wide open position.
Figure 5 is a fragmentary view of a part of the mechanism shown in Figure 4, but illustrating the speed regulating valve in throttled or partially closed position.
Figure 6 is a detached end elevation of the valve housing block and parts of the associated mechanism.
Figure 7 is a cross sectional view taken on line 7—7 of Figure 6, and illustrating the start and stop control valve in the position it assumes when the motor is stopped.
Figure 8 is a view similar to Figure 7, but showing the start and stop control valve in motor operating position.

The pump E is secured to the slanting face 30 (Figure 6) of the control valve housing block D by screws 30a, and the pump outlet opening 22 is aligned with the inlet passage 31 leading into the block D. Referring particularly to Figures 7 and 8, the inlet passage 31 leads into a vertical bore 32 which is connected near its upper end to a horizontally extending exhaust port or hole 33, and near its lower end to a horizontally extending inlet passage 34. Disposed in the bore 32 is a double piston valve comprising an upper closure member 35 and a lower closure member 36. A pin 37 extends upwardly from the piston portion 35 and a head 38 provides a seat for the upper end of the compression spring 39, the lower end of which seats in a recess 40 in the top of the block D. A connecting rod 41 joins the upper piston member 35 and the lower piston member 36, and it will be apparent from Figure 7 that the spring 39 tends to maintain the piston valve member in the position shown in Figure 7. When in this position, liquid under pressure, which is supplied by the pump E to the passage 31, follows the path shown by the arrows (Figure 7), and is discharged out through the exhaust port 33. In the illustrated motor, which is intended to be disposed in an oil retaining vessel, the oil thus discharged merely returns to the sump in the bottom of the vessel and oil under pressure will not flow through the motor.

When the valve actuating bar 42, which will be described in detail later, is pushed downwardly from the position shown in Figure 7 to that shown in Figure 8, the spring 39 is compressed, the piston member 35 closes off the exhaust port 33, and the piston member 36 moves downwardly to connect the motor supply passage 34 to the interior of the bore 32, thus permitting oil to be discharged as indicated by the arrows in Figure 8 from the pump E through the passage 31, bore 32, and passage 34 into the motor casting.

It should also be noted that when the start and stop control valve 35—36 is in stop position, as seen in Figure 7, the passage 34 which leads to the motor is open to atmosphere through the lower end of the bore 32. This permits free manual movement of the wiper blade when the motor is stopped, even though liquid under pressure is being supplied to the control valve housing block D.

Figures 4 and 5 illustrate the throttle or speed regulating valve whereby the speed of operation of the motor may be controlled. This valve comprises a plunger 43 which is provided with a spring 44 at its end, said spring abutting against a head 45 on the plunger 43 and against a seat in the block D. The spring 44 tends to move the valve plunger 43 away from the hole 46, which leads from the passage 34 to the outer surface of the block D. A lever 47 is pivotally secured to the block D at 48, and has a bottom end portion 49 engaging the head 45 of the valve plunger 43. By means of a connecting link 50, leading to any suitable operating point, the position of the valve plunger 43 may be adjusted. As shown in Figure 4 the spring 44 has moved the plunger 43 to fully expose the hole 46. This represents the high speed positon of the pump as the passage 46 leading to the motor is not throttled in any degree. In Figure 5 the operator has adjusted the position of the lever 47 by pulling on the link 50, so that the end of the valve plunger 43 covers a considerable portion of the hole 46. Thus the oil passage leading to the motor is restricted in any desired degree and the speed of operation of the motor can be accurately controlled.

Having described the means by which a liquid, such as oil, may be supplied under pressure to the motor, it will now be in order to describe in considerable detail the main motor block or casting C, so that the location of the various oil passages therein may be understood.

Figure 9:
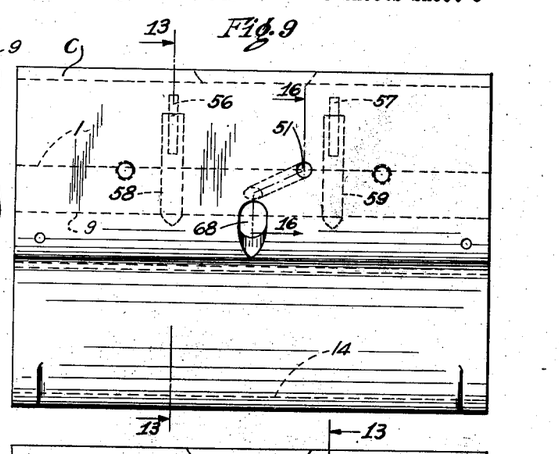
Figure 9 is a detached side elevation of the pump side of the main motor casting.
Figures 10, 11:
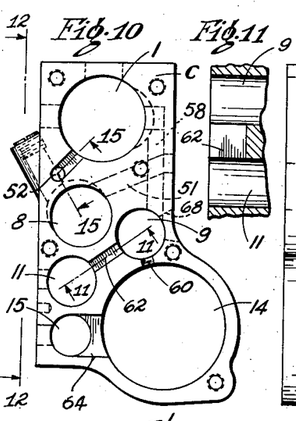
Figure 10 is an end elevation of the casting shown in Figure 9.
Figure 11 is a fragmentary cross sectional view taken on line 11—11 of Figure 10.
Figure 12:
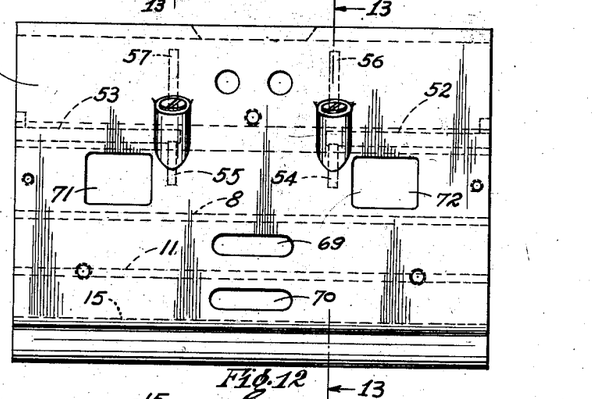
Figure 12 is a view similar to Figure 9, but illustrating the valve side of the main casting, as indicated by the line 12—12 of Figure 10.
Figure 13:
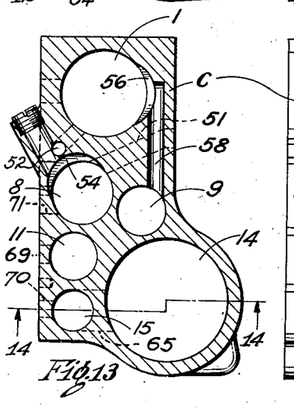
Figure 13 is a vertical cross sectional view of the main casting taken on line 13—13 of Figures 9 and 12.
Figures 14, 15, 16:
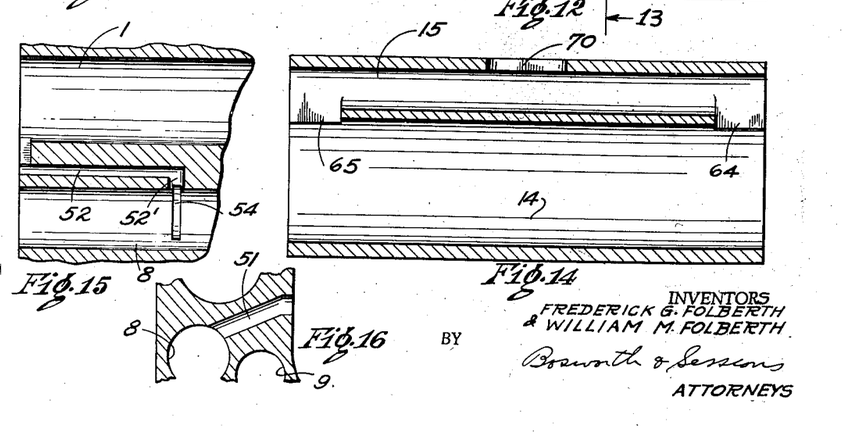
Figure 14 is a horizontal cross sectional view taken on line 14—14 of Figure 13.
Figure 15 is a fragmentary cross sectional view taken on line 15—15 of Figure 10, and showing the connection between the operating cylinder and the valve chamber.
Figure 16 is a fragmentary oblique cross-sectional view taken on line 16—16 of Figure 9 and illustrating the diagonal passage in the main casting from the control valve housing block into the operating valve chamber.

When the control valve housing block D is secured to the casting the hole 46 aligns with the end of inlet hole 51, which, as seen in Figures 9, 10 and 16, extends diagonally downward from the pump side of the casting C into the center of the operating valve chamber 8. From the operating valve chamber 8 to the ends of the main operating cylinder 1 a pair of passages 52 and 53 extend. Note Fig. 12 is a view of the opposite side of the motor from that shown in Fig. 9.) The passageway 52 is clearly seen in Figures 12 and 15, and its end 52' terminates in a groove 54 which is clearly seen in Figures 12, 13, 15 and 36. Passage 52 leads from a point on one side of the center of the valve chamber 8 to the corresponding end of the operating cylinder 1, while passage 53 leads to the opposite end of cylinder 1 from a groove 55, spaced from the center of chamber 8 the same distance as groove 54.

Slots 56 and 57 are cut in the walls of the main cylinder 1 equidistant from its center line (Figs. 12, 18 and 36, noting that Fig. 18 is an opposite view). These slots are connected to the bore 9 (Figs. 9 and 18) for the lag control sleeve valve by means of holes 58 and 59. As is seen in Figures 10, 18 and 21, slots 60 and 61 extend from the ends of the lag control sleeve bore 9 into the large delay cylinder 14 (Figs. 18, 21 and 22), and similar slots 62 and 63 extend from the bore 9 into the bore 11 for the small valve actuating piston 12 (Figs. 17, 21, 23 and 36). Extending inwardly from the ends of the casting C, the wall between the bore 15 and the large delay cylinder 14 is cut away as seen at 64 and 65 in Figures 14, 22 and 36. This cut-away portion permits the sliding bar member 16 and its piston engaging arms 66 and 67 to reciprocate in the bore 15.

In order to permit the lag control sleeve 10 to be rotated within its bore 9 (Figs. 18, 21 and 23) a hole 68 is provided which extends through the pump side of the casting C (Figure 9) forming an aperture for the movement of lever 79. Elongated slots 69 and 70 extend through the valve side of the casting (Figure 12) from the bores 11 and 15 respectively, and enlarged rectangular apertures 71 and 72 also extend through the valve side of the casting C into the operating valve chamber 8.

The lag control sleeve valve 10 which is disposed in the bore 9 is shown in detail in Figures 18, 19, 20 and 21. It includes a solid central portion and tubular end portions 73 and 74. Holes 75 and 76 enter the tubular portions 73 and 74 respectively, and, when the sleeve 10 is in position, are aligned with the bottom ends of the passages 58 and 59 which connect the main cylinder 1 with the bore 9. Adjacent the outer ends of the tubular portions 73 and 74 are openings 77 and 78. As is seen in Figure 21, the opening 77 is wide enough to bridge across the inner ends of the slots 60 and 62 in the main casting C, and in like manner the opening 78 is adapted to bridge the slots 61 and 63 at the other end of the casting C. An operating handle 79 is attached to the center portion of the sleeve 10 and projects out through the hole 68 in the casting C.

End cover plates 80 and 81 are secured to the casting C by screws 82, and serve to close the ends of the various cylindrical bores in the casting C. In order to actuate the main valve which is contained in the chamber 8 (Fig. 36) of the main casting C, we provide a valve actuating plate 83 (seen in detached view in Fig. 28 and in position on the motor in Fig. 1). This plate 83 is formed with elongated slots 84 and 85, and is held in position against the face of the casting C by headed screws 86 and 87 which are threaded into the main casting C and provide a support for the plate 83, whereby it can slide back and forth, the screws 86 and 87 extending through the slots 84 and 85 respectively. A third screw 88 extends through another slot 89 and guides and supports the upper portion of the plate 83. Inwardly extending arms 90 and 91 are formed on the plate 83, and are provided with yoke ends 92 (Fig. 36) which extend into the holes 71 and 72 in casting C and which, as is clearly seen in Figure 29, enter the slots 93 in the main valve sleeve member 94, and slip into the grooves 95 in the inner valve member 96. Thus movement of the plate 83 on its supporting pins will cause corresponding movement of the inner valve member 96.

In order to connect the valve actuating plate 83 to the small valve operating piston 12, a pin 97 is secured in the center of the piston 12 and projects out through the slot 69 in the main casting (Figs. 1, 3, 12 and 23). This pin passes through a hole 98 in the plate 83, and it will be seen that movement of the piston 12 in the cylinder 11 will cause corresponding movement of the plate 83.

In addition to the just described connection between the piston 12 and the plate 83, a second driving connection is established between the sliding bar 16 and the plate 83 by means of a pin 99 secured in bar 16 (Figs. 1, 3, 12 and 22) and extending out through the slot 70 in the main casting C. This pin 99 passes through a hole 99a in the plate 83.

Figures 30, 31, 32, 33, 34:
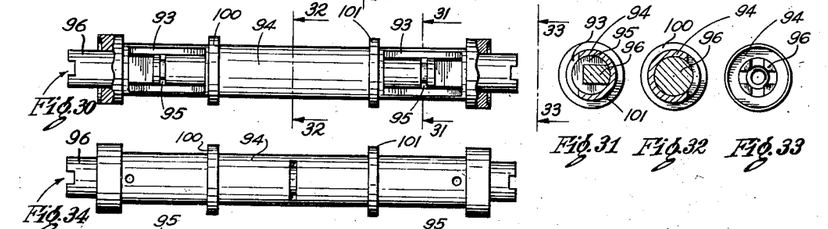
Figure 30 is a detached view of the operating valve including the outer sleeve member and inner plunger member.
Figures 31, 32 and 33 are views taken respectively on lines 31—31, 32—32 and 33—33 of Figure 30.
Figure 34 is a view of the assembly shown in Figure 30 taken at substantially 180° from Figure 30.
Figure 35:
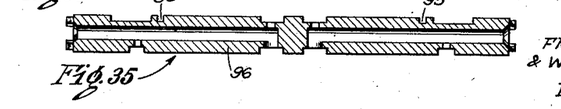
Figure 35 is a detached cross-sectional view of the operating valve inner plunger.

The main valve assembly which includes the outer sleeve 94 and inner member 96 (Figs. 30 and 36) is similar in its construction and operation to the valve illustrated and described in our above identified United States Patent No. 2,343,656. As the valve construction itself forms no part of the present invention, it will suffice to point out herein that when liquid under pressure is supplied through the passage 51 in the main casting, it enters the valve chamber 8 in the space between the flanges 100 and 101 on the valve sleeve 94 (Fig. 36). The outlet openings 54 and 55 from the valve chamber 8 are controlled by the flanges 100 and 101, and thus these flanges control the flow of operating liquid from the source of pressure to the opposite ends of the main cylinder 1. Sliding of the valve sleeve 94 to shift the pressure conducting connections from one end to the other of the main cylinder 1 is effected by the action of the liquid under pressure on the ends of the sleeve 94. This action is controlled by movement of the inner valve member 96 which is positively moved by its connection with the valve actuating plate 83 through the pins 97 and 99. The movement of member 96 admits fluid under pressure to an end of cylinder 8 to move the valve sleeve 94 in the same direction as the immediately preceding movement of valve member 96.

Having described the essential elements of the illustrated embodiment of our improved motor construction, its operation, when liquid under pressure is supplied through the inlet passage 51 in the casting C, will now be described: Oil or other operating fluid under pressure passes through the hole 51 into the valve chamber 8. Depending upon the position of the valve sleeve member 94, the liquid is directed from the chamber 8 to one end or the other of the main cylinder 1. In Figure 36 the valve sleeve 94 is in its left hand position, and the slot 55 is opened to the oil under pressure, while the slot 54 is closed off by the flange 101. From the slot 55 oil passes through the hole 53 (see Fig. 12) to the left hand end of the main cylinder 1 (Figs. 12 and 36). The oil under pressure will cause the piston 2 to move to the right, as seen in Figure 36, and this movement will rotate the shaft 7 through the rack 5 and gear 6. Oil in the chamber 1 to the right of the piston is discharged through passage 52 leading from the end of the chamber 1 to slot 54 and is exhausted through port 72 which communicates with the space around valve member 94 to the right of flange 101 (Figs. 12 and 36). Just before the piston 2 reaches the right hand end of cylinder 1, the end portion 3 of the piston will expose the slot 57 in the wall of the cylinder 1, which will permit oil which enters the left hand end of cylinder 1 to escape through the slot 57 and its vertical connecting passage 59 to the bore 9 (Fig. 18, a view taken from the side opposite that of Figs. 12 and 36), in which bore the lag control sleeve 10 is disposed. As the lower end of the hole 59 is aligned with the hole 76 (Fig. 18) in the sleeve 10, oil will move out through the tubular portion 74 of the sleeve 10, and thence through passage 63 in cylinder 11, or both of the passages 63 and 61 into the cylinders 11 and 14, depending upon the position of the sleeve 10.

In Fig. 21, the sleeve 10 is in position to direct oil from the passages 58 and 59 (Fig. 18) into both the cylinders 11 and 14 while in Figure 23 the lag control sleeve 10 is in position to direct oil only into the small cylinder 11. When in the position shown in Figure 23 the oil which passes down through the slot 57, hole 59 and slot 63 enters the left hand end of the cylinder 11 (Fig. 36). This causes the small piston 12 to move to the right from the position shown in Figure 36. The fluid in the right hand portion of cylinder 11 escapes ahead of piston 12 through opening 62, passageway 58 and slot 56 (Figs. 17, 18, 21 and 36) and then may escape through the slot provided for gear segment 6. During such movement of the small piston 12 the pin 97, which is attached thereto and which extends through the hole 98 in the valve operating plate 83, will shift the valve operating plate a distance corresponding to the movement of the piston 12. This shifting of the valve plate 83 will move the inner valve member 96, which in turn will cause the outer valve sleeve 94 to move in the same direction by fluid pressure at its end from the position shown in Figure 36 to a corresponding position at the opposite end of the valve chamber 8. This movement of the valve sleeve 94 will shift the connections from the source of oil under pressure and shut off the slot 55 and open the slot 54, thus permitting oil to pass from the slot 54 through the hole 52 to the right hand end of cylinder 1 (Fig. 12). This will cause the cycle of operation to be repeated with the piston 2 moving to the left until the port or slot 56 is exposed, whereupon oil will flow down into the small cylinder 11 and shift the piston 12 (Figs. 23 and 36), causing the valve plate 83 to move again and shift the control valve mechanism. This cycle will be repeated until the supply of oil or other liquid under pressure is shut off and the motor will operate without substantial lag at the ends of its stroke.

When the lag control sleeve 10 is in the position shown in Figure 21, oil which enters the sleeve through the passages 58 and 59 may enter both cylinders 11 and 14. Referring back to the above explanation of the operation of our motor, with the parts as shown in Figure 21, when the piston 2 reaches the right hand end of its stroke (Fig. 36) and the port 57 is open, oil will flow through the hole 59, hole 76 in the sleeve 10 (Fig. 18, a view taken from the side opposite to that of Fig. 36), the tubular portion 74 of sleeve 10, and out through the hole 78 in the end of the sleeve into the left hand ends of both cylinders 11 and 14 (Fig. 36) by way of passages 63 and 61, respectively, (Figs. 36 and 22). Under these circumstances, the piston 12, however, will not move immediately because the floating piston 13 in the large delay cylinder can move more easily, and will continue to move as oil enters the large cylinder 14 until the piston 13 strikes the arm 67 at the opposite end of the cylinder (Fig. 22). During movement of the floating piston 13, the fluid in cylinder 14 ahead of the piston (at the left end as viewed in Figure 18) may escape through opening 60 thence through port 77, tubular portion 73, port 75 and passageway 58 to slot 56 (Figs. 18 and 19) and may be discharged through the slot provided for gear segment 6. When the floating piston 13 strikes the arm 67, it will continue to move, carrying with it the operating rod 16 which, through the pin 99, moves the valve operating plate 83 to shift the valve mechanism into its opposite position. Of course, during this movement of plate 83 the small piston 12 and its pin 97 will also move.

The piston 2 will now move to the opposite end of the cylinder 1 and, when the port 56 is exposed (Fig. 36), oil will flow through the passage 58 (Fig. 18) and the passages in the sleeve 10, and will enter the cylinders 11 and 14, moving the floating piston 13 back to the other end of the cylinder 14. During the time that it takes to fill the large lag cylinder 14 with oil, the piston 2 and the wiper operating shaft 7 will remain stationary in the end position of their stroke.

Thus when the control rod 79 is in its upper position, as shown in Figure 21, the shaft 7 will be oscillated back and forth with a predetermined and definite period of delay at each end of its oscillatory movement. This lag or delay may be established at the desired value by providing a cylinder 14 of the proper volume. In the continuous operating position shown in Figure 23 in which the arm 79 is in its lower position, oil does not enter the large delay cylinder 14, but merely acts on the ends of the small valve actuating piston 12. With this arrangement the delay in shifting the main control valve from one position to the other is practically completely eliminated, and we have found it entirely practical to operate a windshield cleaner motor of the type illustrated herein at any speed from very slow up to one thousand or more strokes per minute when the lag control arm 79 is in the position shown in Figure 23.

In order to control the starting and stopping of our improved motor in the most desirable manner, we have devised certain operating connections which control the flow of liquid to the motor, and these will now be described.

Figure 1:
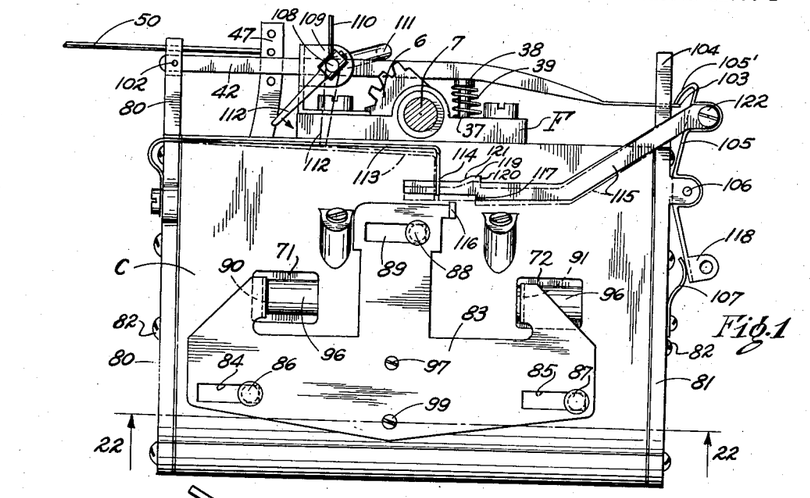
Figure 1 is an elevational view of the valve operating side of our improved motor.
Figure 2:
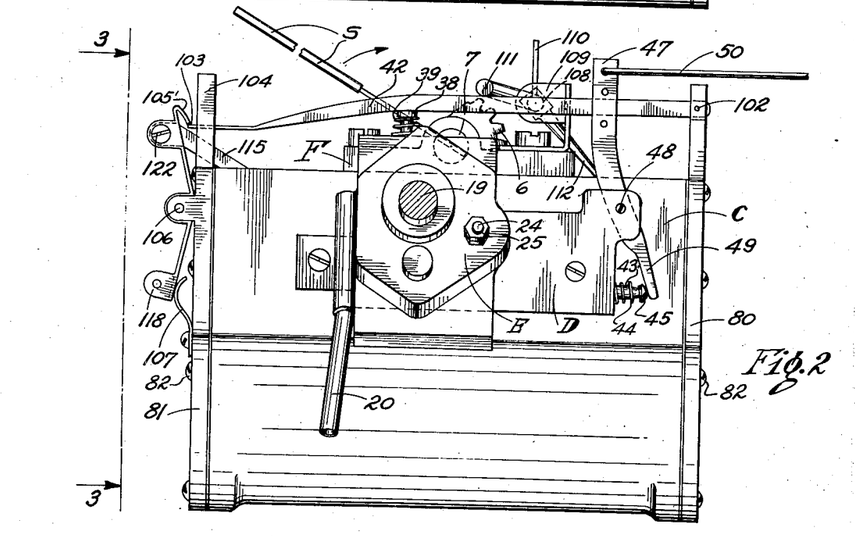
Figure 2 is an elevational view of the opposite side of the motor from that shown in Figure 1.

As is seen in Figures 1, 2 and 3 the valve actuating bar or lever arm 42 engages the head 38 of the double piston valve 35—36 (Figs. 7 and 8). This bar 42 is pivotally mounted at 102 on an upwardly extending projection on the end cover plate 80 (Figure 1). The opposite end of bar 42 is preferably flattened as seen at 103, and extends through a slot 104' in guide member 104 on the end plate 81. The latch 105 is pivotally mounted on the end plate 81 at 106, and a spring 107, also carried by end plate 81, normally urges the upper end of latch arm 105 toward operating bar 42. The hooked end 105' permits the end of bar 42 to slide down thereover and be latched when it snaps over the end, as is clearly shown in Figure 1. When in this position the valve 35—36 is in the position shown in Figure 8 and liquid under pressure is supplied to the motor, and the motor will operate. In order conveniently to move the pivoted bar 42 into operating position, as shown in Figure 1, we provide a crank shaft 108 which is rotatably supported in a bracket 109, and which may be provided with an operating handle 110 at its outer end. The crank end 111 of the shaft 108 will push downwardly when the handle 110 is rotated in clockwise direction, as seen in Figure 1, and this will depress the bar 42, opening the valve 35—36 and locking it open due to the engagement of the latch 105' with the end portion 103 of the bar 42.

It is desirable in apparatus of this kind to provide means whereby the motor always stops at the same point in its stroke. This permits the cleaner wiper blade always to be stopped in a withdrawn or out-of-the-way position whenever the motor is shut off and without any manual manipulation by the operator. We have provided means for accomplishing this purpose which is shown best in Figures 1, 2 and 3. An arm 112 is secured to the shaft 108 on the opposite side of the main casting C from the crank portion 111. This arm 112 is disposed above a resilient supporting member 113 which is secured to the end cover plate 80, and which has a hole 114 at its opposite end. An operating bar 115 projects through and has sliding engagement in the hole 114, and, when the motor is operating and the crank shaft 108 is in the position shown in Figure 1, the spring supporting member 113 holds the operating bar 115 in its upper position, seen in full lines in Figure 1. When in this position the projecting lug 116 on the valve actuating plate 83 will clear the notch face 117 on the operating bar 115.

When it is desired to stop the motor, the operator turns the handle 110 in counter-clockwise direction, as seen in Figure 1, lifting the crank portion 111 off of the operating bar 42. When this occurs, however, the motor does not stop as the bar 42 does not move because it is latched by the latch arm 105. Continued movement of the handle 110 in counter-clockwise direction causes the bottom end of arm 112 to engage the top of the spring supporting member 113, and depress it downwardly into the position shown in dot and dash lines in Figure 1. This likewise, due to the disposition of the end of the operating bar 115 in the hole 114, depresses the inner end of bar 115 and places the projecting notch face or lug 117 in the line of travel of the lug 116 on the valve plate 83. Due to the resiliency of the member 113, the operator can move the handle 110 at any point during the stroke of the motor, but the motor will not stop until the lug 116 on the plate 83 engages the notch face 117 during movement to the right (Fig. 1) and, by pushing on the notch 117, moves the arm 115 and swings the latch 105 about its pivot 106 to release the bar 42, and permit the spring 39 to lift the valve 35—36 and the arm 42. Lifting the valve 35—36 into the position shown in Figure 7 shuts off the supply of liquid under pressure, immediately stopping the motor, and connects the motor supply opening 51 directly to atmosphere through the holes 46, 34 and 32.

This connection permits the piston 2 to move back and forth freely within its cylinder, and the shaft 7 can therefore be rotated without resistance to its movement. Thus a wiper arm driven by shaft 7 can be manually operated if desired. Our improved automatic stopping mechanism assures that the motor will always stop at the same point in its cycle or stroke. The stopping point, as illustrated in Figure 1, is located at one end of the stroke of the piston 2. However by varying the position of the notch 117 on the operating arm 115, the stopping point may be varied as desired.

At the lower end of the latch member 105 is a projecting flange 118, and on the upper side of the operating bar 115 is a lug 119 having a vertical face 120 and a sloping face 121. If it is desired to have the motor stop automatically at the opposite end of its stroke, it is only necessary to loosen the screw 122 which pivotally secures the arm 115 to the latch member 105 and turn over the arm 115, so that the screw 122 enters the flange 118, and the bar 115 extends from the lower end of member 105 to and through the hole 114 in the spring 113. When in this position the lug 116 will hook on to the straight face 120 and pull on the bar 115 during movement of the plate 83 to the left. This pulling of the bar 115, acting through the lower part of pivoted latch 105, will release the end 103 of bar 42 and stop the motor in the manner previously described, but at a point other than that at which the motor will stop when the bar 115 is in the position shown in Figure 1. By providing the double ended arm 105 the same mechanism may be employed to cause the motor to stop at either of two different positions, depending upon whether the arm 115 is secured to the top or bottom of the latch member 105.

In Figures 37 to 40 we have illustrated a modified control mechanism for our motor. In this apparatus a by-pass passage 123 extends from the pump outlet 124 to the pump inlet 125. A plunger valve 126 has a sliding fit in the pump housing 127 and may be moved to enter the passage 123 and close it off. A safety pressure regulating valve 128 is provided and is similar in construction and mode of operation to the valve 23. The independent by-pass passage 129 may be opened by movement of the valve 128 to permit oil to flow from the pump outlet through passage 129 and back to the pump inlet through the chamber 130. It should be noted that the chamber 130 is of larger diameter than the valve pin 126, so that, even though the valve 126 is closed, the safety valve 128 will be effective to permit the by-passing of oil around the pump when the pressure exceeds a value which is controlled by the spring 131.

The valve plunger 126 is operated by a lever 133 which is pivotally secured on the pump housing at 134, and which has an elongated operating arm 135 extending in a generally horizontal direction. In order to operate the motor, valve 126 must of course be closed so that the by-pass passage 123 will not permit the circulation of oil around the pump. In order to insure closing of the valve 126 when the crank member 111 is moved to depress the arm 42, we provide an interconnecting lever 136 which is pivotally supported on the motor at 137. The arm 42 engages the end 138 of lever 136 and, when the arm 42 is moved downwardly to open the valve 35—36, the opposite end 139 of lever 136 will be elevated. As is clearly seen in Figure 40, the end 139 engages the portion 135 of the lever which operates the valve 126. Upward movement of the lever arm 135 will move the valve plunger 126 inwardly to close the hole 123, and thus the motor will positively be supplied with fluid under pressure.

When it is desired to stop the motor, the handle 110 is turned as before. The arm 42 will hold the interlocking lever 136 in the position shown in Figures 40 and 41 until the arm 42 is released from the latch 105. As soon as arm 42 is released, it will snap upwardly and the oil pressure on the end of valve 126 will immediately move the valve plunger 126 outwardly opening the by-pass connection around the pump. In some instances when the by-pass control valve 126 is employed, we may omit the valve 35—36 as the valve 126 will provide an instantaneous starting and stopping means for the motor, which, when coupled with the automatic stop control linkage described herein, will cause the motor always to stop at a predetermined point. When the by-pass 123 and by-pass control valve 126 are employed the pump E does substantially no work when the motor is not operating, as there is a direct by-pass from the pump outlet 124 back to the pump inlet through the passage 123.

In some instances the lag or delay at the ends of the motor stroke may not be necessary or desirable. In such cases the large delay cylinder and the floating piston therein, together with the valve operating connections which are adapted to be engaged by the floating piston, may be omitted. In a motor of this type the main piston will reciprocate substantially continuously as the valve will be shifted immediately upon the main piston reaching each end of its stroke.

Although we have described our improved oscillating motor as having a piston reciprocating in a cylinder, it will be understood that our improved features might readily be combined in other types of reciprocating motors. For example, a vane type piston could be employed in a segmental chamber and, although we have described the illustrated embodiments of our invention in considerable detail, it will be understood by those skilled in the art that numerous variations and modifications may be made in the particular form of the elements which are combined to build up our improved motor. We do not therefore wish to be limited to the exact form of our motor herein shown, and described, but claim as our invention all embodiments thereof coming within the scope of the appended claims.

We claim:

1. In a fluid pressure actuated motor of the type described, a drive member, walls defining a chamber in which said drive member is adapted to reciprocate, valve means for controlling the flow of fluid to and from said chamber, a cylinder, a rapid action valve actuating piston member in said cylinder, a second cylinder, a delayed action piston in said second cylinder, fluid connections leading to said cylinders from said chamber, valve operating connections between each of said pistons and said valve, and means for rendering said delayed action piston inoperative whereby only said rapid action piston will operate.

2. In a fluid pressure actuated motor of the type described, a main cylinder, a drive piston in said main cylinder, valve means for controlling the flow of fluid to and from said main cylinder, a large cylinder having a delayed action piston therein for actuating said valve means, a small cylinder having a rapid action piston therein for actuating said valve means, mechanical operating connections between said valve means and said delayed action piston and said rapid action piston, fluid conducting passages for conducting fluid from said main cylinder to said large cylinder and to said small cylinder, and means for controlling the flow of liquid from said main cylinder to said large and small cylinders whereby the flow of liquid to said large cylinder may be be shut off.

3. A motor of the type described including a main chamber, a movable drive member in said main chamber, means for conducting fluid under pressure to and from said main chamber, main valve means in said fluid conducting means for controlling the flow of fluid under pressure to said main chamber, a first cylinder having a rapid action valve actuating piston therein, a second cylinder having a delayed action valve actuating piston therein, operating connections between each of said pistons and said main valve means, fluid conducting connections from said main chamber to said rapid action and delayed action cylinder, and valve means in said connections adapted to shut off the connections from said main chamber to said second cylinder.

4. In a motor of the type described a main chamber, a drive member adapted to reciprocate therein, a main valve chamber, main valve means operable therein for controlling the flow of fluid to and from said main chamber, a first chamber, a rapid action main valve actuating piston in said first chamber, a second chamber, a delayed action main valve actuating piston in said second chamber, a control valve chamber, fluid conducting passages between said main chamber and said control valve chamber, fluid conducting passages between said control valve chamber and said first chamber and said second chamber, mechanical operating connections between said pistons and said main valve means, and a control valve in said control valve chamber adapted in one position to connect both said first chamber and said second chamber to said main chamber and in another position to connect only said first chamber to said main chamber.

5. In combination with a fluid pressure actuated motor having a drive member having automatic reciprocating movement when the motor is operating, a valve for controlling the flow of fluid under pressure to said motor and having one position in which the motor operates and another position in which the motor is stopped, means tending to hold said valve in motor stopped position, means for moving said valve to motor operating position, latch means for maintaining said valve in motor operating position, and means, movable in synchronism with said reciprocating drive member, for releasing said latch means and permitting said valve to move to motor stopped position whereby said drive member will always stop at the same point in its stroke when said valve is closed.

6. In combination with a fluid pressure actuated motor having a part which has automatic reciprocating movement when the motor is operating, a valve for controlling the flow of fluid under pressure to said motor, means tending to hold said valve in motor stopped position, means for moving said valve to motor operating position, latch means for retaining said valve in motor operating position, means for unlatching said latch to permit said valve to move to motor stopped position, means for maintaining said unlatching means out of the path of said reciprocating motor part, and means for moving said unlatching means into the path of said reciprocating part whereby movement of said part will operate said unlatching means to permit said valve to move to motor stopped position.

7. In combination with a fluid pressure actuated motor having a part which has automatic reciprocating movement when the motor is operating, a valve for controlling the flow of fluid under pressure to said motor, means tending to hold said valve in motor stopped position, means for moving said valve to motor operating position, latch means for retaining said valve in motor operating position, means for unlatching said latch to permit said valve to move to motor stopped position, means for maintaining said unlatching means out of the path of said reciprocating motor part, and means for moving said unlatching means into the path of said reciprocating part whereby movement of said part will operate said unlatching means to permit said valve to move to motor stopped position, said unlatching means including an operating lug engageable by said reciprocating part during movement of said part in one direction only.

8. In a fluid pressure actuated motor having a reciprocating part and a control valve adapted to start and stop the motor, means for causing said motor always to stop at the same point in its reciprocating stroke comprising a valve operating member, latch means for holding said valve operating member in motor operating position, a link for moving said latch having a notch formed thereon, means for holding said link with said notch out of the path of said reciprocating part, and means for moving said link holding means and link so that said notch is disposed in the path of said reciprocating part, said reciprocating part having a portion adapted to pass over said notch when moving in one direction and to engage said notch and move said link to release said latch when moving in the opposite direction.

9. Automatic stop mechanism for reciprocating fluid pressure actuated motors of the type described including, a valve controlling the flow of fluid under pressure to said motor, means for opening said valve to permit flow of fluid under pressure to said motor, means for closing said valve to shut off flow of fluid under pressure to said motor, means for holding said valve open, means, operable by a moving part of said motor at a predetermined point in its stroke, for releasing said means for holding said valve open, and means for moving said releasing means from inoperative position in which said motor will continue to operate to operative position in which said moving part of said motor will engage said releasing means and permit said valve closing means to close said valve.

10. In a motor of the type described, a valve for controlling the supply of fluid under pressure to said motor, latch means for holding said valve in open position wherein fluid under pressure is supplied to said motor, a pivoted support for said latch means, and means for releasing said latch means to permit said valve to closed position wherein fluid under pressure is shut off from said motor, said releasing means including a link having lugs formed on opposite sides thereof and a reciprocating part of the motor adapted to engage one of said lugs, said link being adapted to be selectively attached to said latch means on either side of the pivot therefor whereby the lug which engages the reciprocating part of the motor may be changed and the point in the motor stroke at which said valve moves to closed position varied.

FREDERICK G. FOLBERTH.
WILLIAM M. FOLBERTH.